US008976521B2

United States Patent
Liu et al.

(10) Patent No.: US 8,976,521 B2
(45) Date of Patent: Mar. 10, 2015

(54) SURFACE CONTACT CARD HOLDER FOR ELECTRONIC DEVICE

(75) Inventors: Zhen-Lin Liu, Shenzhen (CN); Wen-Ze Liu, Shenzhen (CN)

(73) Assignee: Zhongshan Innocloud Intellectual Property Services Co., Ltd., Guangdong (CN)

(*) Notice: Subject to any disclaimer, the term of this patent is extended or adjusted under 35 U.S.C. 154(b) by 288 days.

(21) Appl. No.: 13/597,571

(22) Filed: Aug. 29, 2012

(65) Prior Publication Data

US 2013/0115796 A1    May 9, 2013

(30) Foreign Application Priority Data

Nov. 4, 2011   (CN) .......................... 2011 1 0344419

(51) Int. Cl.
| | | |
|---|---|---|
| G06F 1/16 | (2006.01) | |
| H05K 5/00 | (2006.01) | |
| H05K 7/00 | (2006.01) | |
| G06K 7/00 | (2006.01) | |
| G06K 13/08 | (2006.01) | |
| H01R 13/443 | (2006.01) | |
| H01R 13/633 | (2006.01) | |

(52) U.S. Cl.
CPC ............ *G06F 1/1658* (2013.01); *G06K 7/0021* (2013.01); *G06K 7/0069* (2013.01); *G06K 13/0831* (2013.01); *H01R 13/443* (2013.01); *H01R 13/6335* (2013.01); *H01R 2201/06* (2013.01)
USPC ................. 361/679.38; 361/679.39; 361/737; 439/326; 439/630

(58) Field of Classification Search
CPC . G06K 7/0021; G06K 7/0069; G06K 13/081; H01R 13/4538; H01R 13/6335
USPC ........ 361/737, 679.38–679.39; 439/325, 326, 439/630
See application file for complete search history.

(56) References Cited

U.S. PATENT DOCUMENTS

| | | | | |
|---|---|---|---|---|
| 5,136,146 | A  * | 8/1992 | Anglin et al. ................. | 235/441 |
| 6,602,096 | B1 * | 8/2003 | Kronestedt et al. ........... | 439/630 |
| 7,442,086 | B1 * | 10/2008 | Chang ........................... | 439/630 |
| 8,150,466 | B2 * | 4/2012 | Park et al. ..................... | 455/558 |
| 8,200,282 | B2 * | 6/2012 | Liang et al. ................... | 455/558 |
| 8,371,866 | B1 * | 2/2013 | Su et al. ........................ | 439/159 |
| 8,432,682 | B2 * | 4/2013 | Quan et al. ............... | 361/679.38 |
| 2006/0231619 | A1* | 10/2006 | Lee ................................ | 235/441 |
| 2006/0274511 | A1* | 12/2006 | Choi ............................. | 361/754 |
| 2007/0235538 | A1* | 10/2007 | Wen .............................. | 235/441 |
| 2009/0267677 | A1* | 10/2009 | Myers et al. .................. | 327/356 |
| 2011/0194263 | A1* | 8/2011 | Shen et al. .................... | 361/754 |
| 2012/0162925 | A1* | 6/2012 | Luo et al. ...................... | 361/727 |
| 2012/0195013 | A1* | 8/2012 | Trzaskos et al. .............. | 361/754 |
| 2012/0307451 | A1* | 12/2012 | Shukla et al. ................. | 361/699 |

* cited by examiner

*Primary Examiner* — Adrian S Wilson
*Assistant Examiner* — Abhishek Rathod
(74) *Attorney, Agent, or Firm* — Novak Druce Connolly Bove + Quigg LLP

(57) ABSTRACT

A surface contact card holder includes a housing and a tray assembly. The housing includes a receiving frame and defining a receiving hole. The tray assembly includes a tray and a cover. The tray is slidable and receivable in the receiving frame from the receiving hole, the tray is configured for carrying a surface contact card therein. The cover is pivotally attached to the tray and covering the receiving hole. The cover includes a first end and a second end. When the first end of the cover is pressed to pivot the cover, the second end of the cover moves out of the receiving hole, the tray is slid out of the receiving frame to allow insertion and removal of the surface contact card from the housing.

16 Claims, 5 Drawing Sheets

SURFACE CONTACT CARD HOLDER FOR ELECTRONIC DEVICE

BACKGROUND

1. Technical Field

The present disclosure generally relates to card use in electronic devices and, particularly, to a surface contact card holder for an electronic device.

2. Description of Related Art

With the development of wireless communication and information processing technologies, portable electronic devices such as mobile phones are now widely used. Surface contact cards having special circuits are widely used in portable electronic devices to enhance or add to the functions of the portable electronic devices. For example, a subscriber identity module (SIM) card can be placed in a mobile phone to dedicate the mobile phone's functions to the SIM card owner. By changing SIM cards, a single mobile phone can be used by many different SIM card owners as a personal phone.

During the insertion and/or removal of SIM cards from personal electronic devices, friction is produced between the SIM card and a connector under the SIM card. Thus, after repeated use, the contact terminals of the SIM card and the connector are likely to wear. This wear may result, e.g., in an ineffective electrical connection between the chip card and the connector.

Therefore, there is room for improvement within the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the surface contact card holder. Moreover, in the drawings, like reference numerals designate corresponding parts throughout the several views.

DETAILED DESCRIPTION

The disclosed surface contact card holder can seat surface contact cards such as SIM cards, compact flash cards (CFs) and multimedia cards (MMCs), for example. The disclosed electronic device, shown in the exemplary embodiment as a mobile phone, can alternatively be a PDA, camera, recorder, or other devices, while remaining well within the scope of the disclosure.

Figure 1:
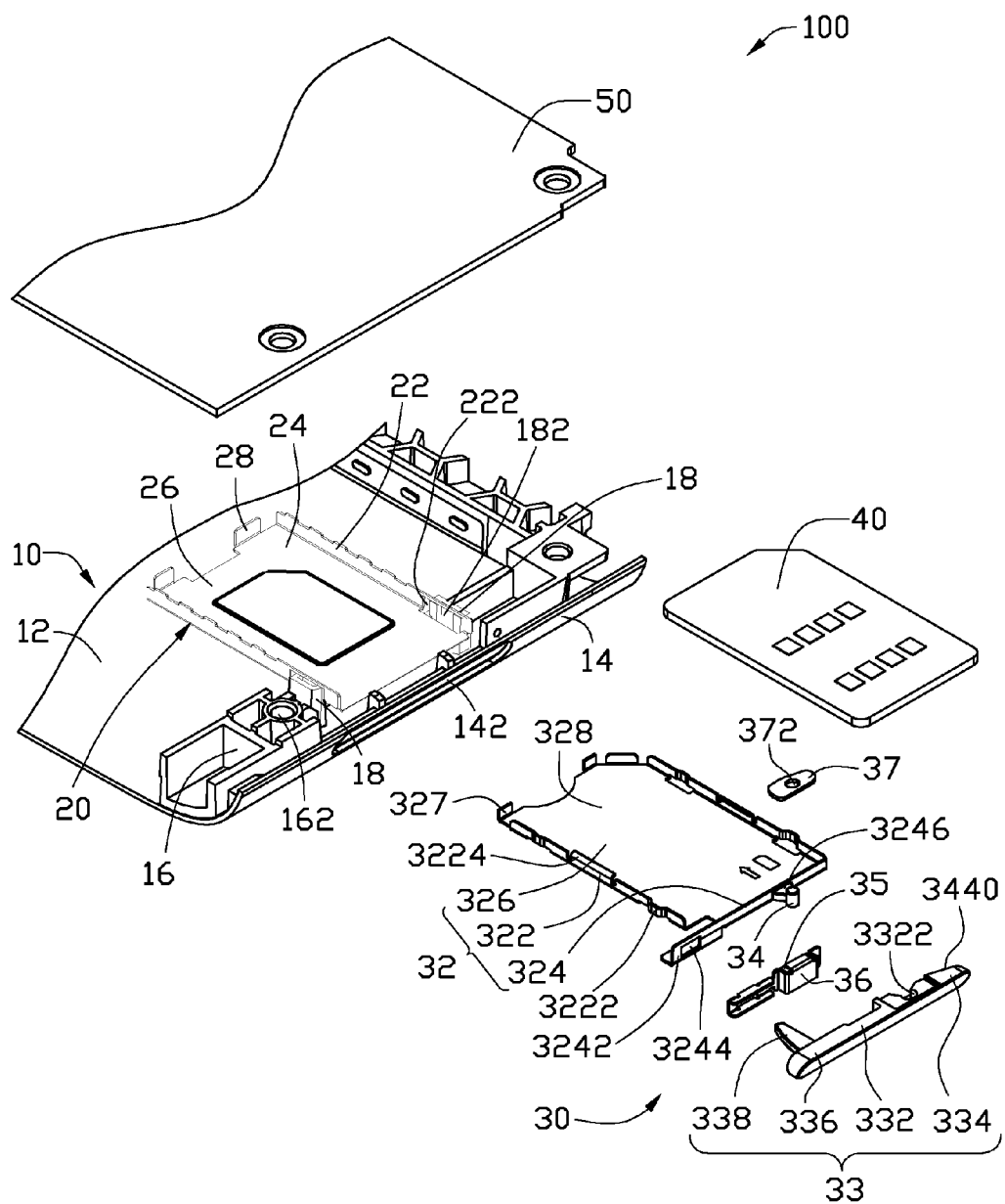
FIG. 1 is an exploded, isometric view of a surface contact card holder in accordance with an exemplary embodiment.

FIG. 1 shows a surface contact card holder 100 mounted on an electronic device. The surface contact card holder 100 includes a housing 10, a receiving frame 20, a tray assembly 30, and a printed circuit board (PCB) 50. The tray assembly 30 may be slidably disposed between the housing 10 and the PCB 50 to receive a surface contact card 40.

The housing 10 may be a portion of the electronic device, and includes a main section 12 integrally formed together with a sidewall 14. Two opposite mounting portions 16 are formed on the main section 12. Each mounting portion 16 defines a screw hole 162 for mounting the PCB 50. The sidewall 14 defines a receiving hole 142 for receiving the tray assembly 30. Two opposite latching portions 18 are formed on the main section 12. Each latching portion 18 is adjacent to a corresponding mounting portion 16, and defines a groove 182.

The receiving frame 20 is positioned on the main section 12, and faces the receiving hole 142. The receiving frame 20 includes two flanges 22, a base 24 and a plurality of resisting edges 28. The flanges 22, the base 24 and the resisting edges 28 cooperatively define a cavity 26 communicating with the receiving hole 142 for receiving the tray assembly 30. Each flange 22 defines an opening 222. Each latching portion 18 faces the opening 222, and are exposed from the openings 222. To mount the receiving frame 20 on the main section 12, the base 24 may be adhered or welded on the main section 12. The resisting edges 28 limit the inward movement of the tray assembly 30 into housing 10.

Figure 3:
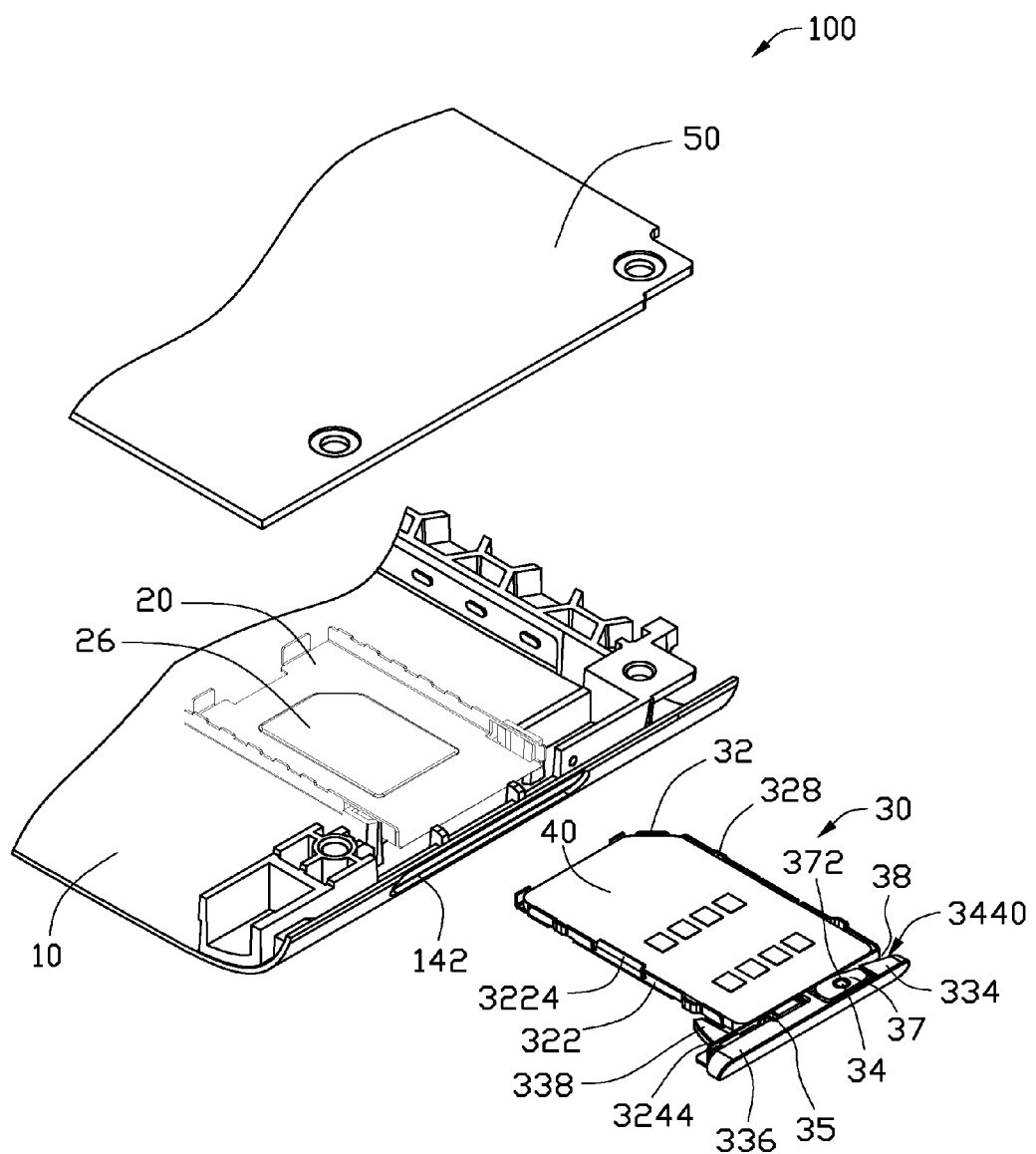
FIG. 3 is a partially assembled isometric view of the surface contact card holder.

Referring to FIG. 3, the tray assembly 30 of the embodiment is shown. The tray assembly 30 includes a tray 32, a cover 33, a pin 34, a magnet 35 and a pin retainer 37.

The tray 32 includes two opposite side edges 322, an end edge 324, a rectangular plate portion 326 and a plurality of stopper edges 327. The side edges 322, the end edge 324, the plate portion 326, and the stopper edges 327 cooperatively define a receiving compartment 328 to receive the surface contact card 40. Each side edge 322 has an arcuate portion 3222 configured for being selectively received in the groove 182. The arcuate portions 3222 position the tray 32 in the cavity 26 of the receiving frame 20. At least one extending edge 3224 is formed on each side edge 322. The extending edge 3224 and the stopper edges 327 are used for preventing the surface contact card 40 from separating from the receiving compartment 328. The end edge 324 has a latching arm 3242 and a block 3246. The latching arm 3242 defines a latching hole 3244. In the embodiment, the pin 34 is formed on the block 3246.

The cover 33 is made of metal, and includes a main body 332, a first end 334, and a second end 336. Note that as used herein, "made of metal" may mean or include a non-metallic material coated with a metallic (magnetic) material. The first end 334 and the second end 336 are formed at opposite ends of the main body 332. The first end 334 has a wedge surface 3340. A protruding plate 338 extends from the second end 336 and is configured for engaging in the latching hole 3244 of the latching arm 3242. The cover 33 defines a pin hole 3322 adjacent to the first end 334. A distance between the pin hole 3322 and the first end 334 is smaller than that of the pin hole 3322 and the second end 336. One end of the pin 34 is inserted into the pin hole 3322 to pivotally connect the cover 33 to the tray 32. The pin retainer 37 defines a notch 372 for latching another end of the pin 37 and prevents the pin 34 from separating from the cover 33.

The magnet 35 is mounted to the end edge 324 of the tray 32 for attracting the cover 33 on the tray 32. In this exemplary embodiment, a latching member 36 is used for receiving the magnet 35. The latching member 36 is mounted on the end edge 324 to position the magnet 35 on the tray 32.

Figure 2:
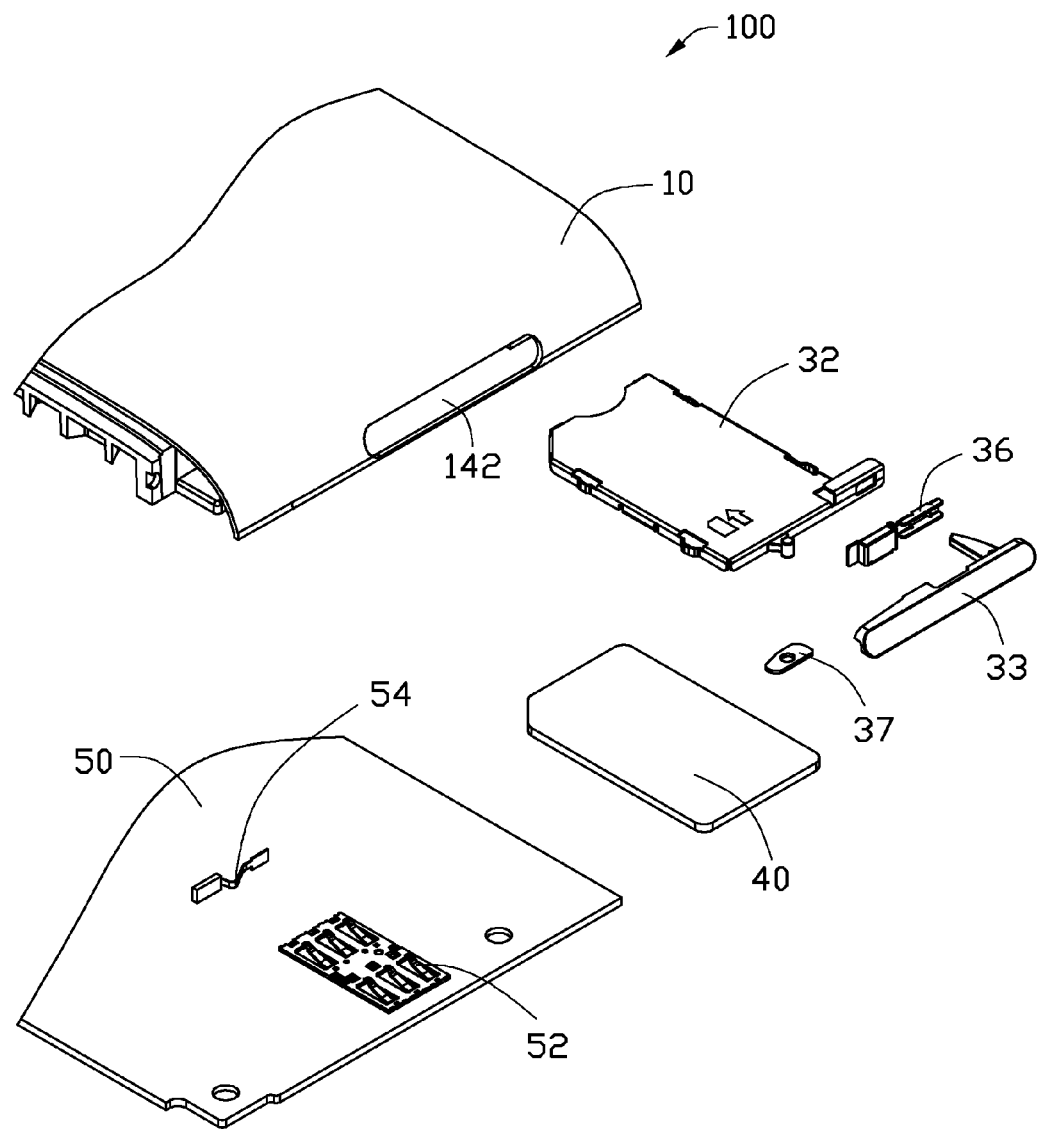
FIG. 2 is similar to FIG. 2, but shown from another aspect.
Figure 4:
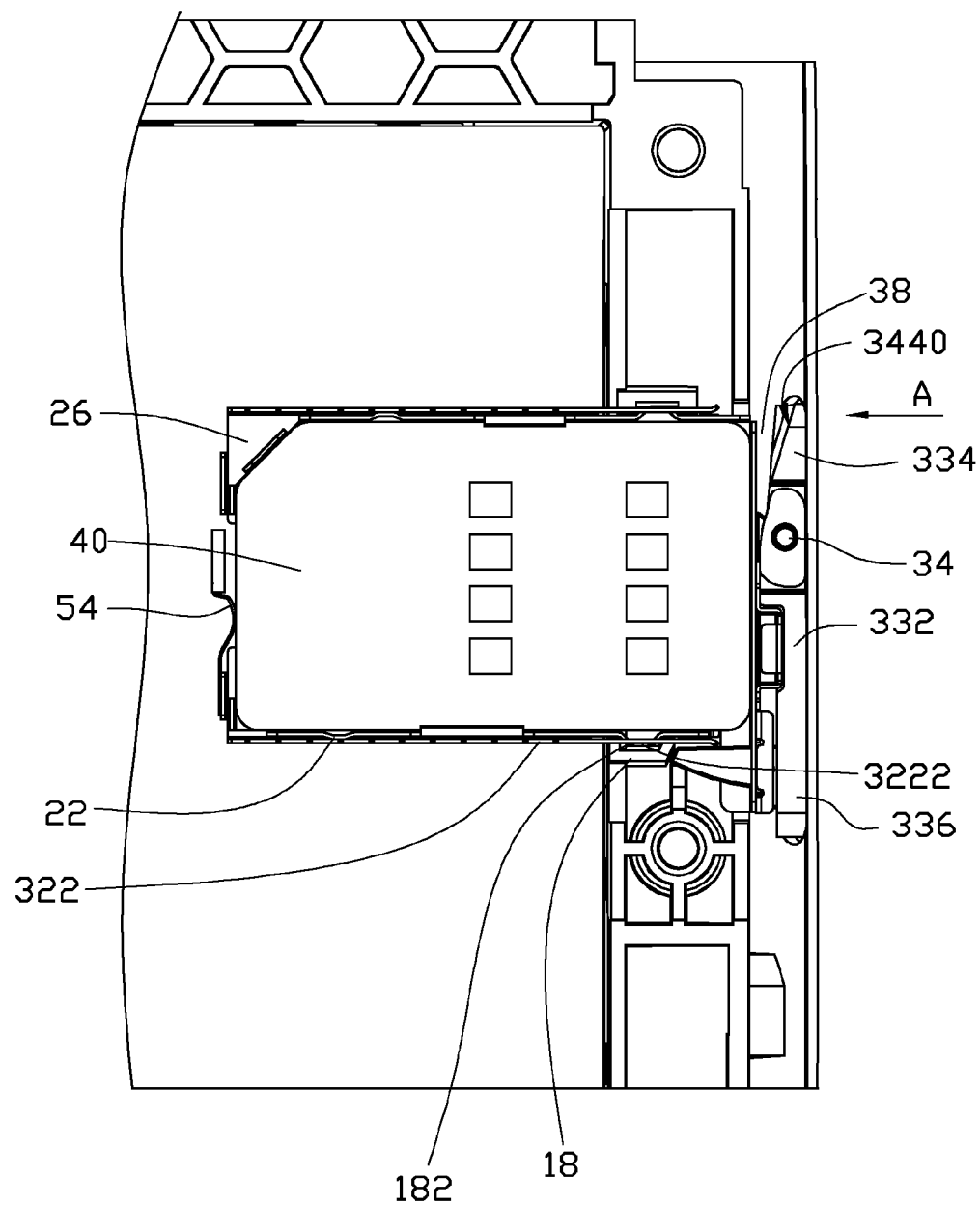
FIG. 4 is a plan view of the surface contact card holder omitting the PCB.

Referring to FIGS. 2 and 4, the PCB 50 has a connector 52 and a sensor 54. The connector 52 is configured for electronically connecting the surface contact card 40. The sensor 54 includes a curved elastic end extending into the receiving frame 20 from the resisting edges 28. When the tray 32 is received in the receiving frame 20, the tray 32 deforms the elastic end of the sensor 54. When the tray 20 is not received the receiving frame, the elastic sheet is at an original state. The sensor 54 will determine that the tray is or not in position according to the deformation of the elastic end, and transmit the results to the electronic device.

During assembly, the magnet 35 is mounted in the latching member 36, and the latching member 36 is mounted on the end edge 324 to attach the magnet 35 on the tray 32. The protruding plate 338 of the cover 33 is inserted into the latching hole 3244 and the magnet 35 attracts the cover 33 to the tray 32. The pin 34 on the tray 32 extends through the pin hole 3322 of the cover 33 to allow the cover 33 to be pivotally connected to the tray 32. The wedge surface 3340 is spaced from the end edge 324 to allow a space 38 to be defined between the first end 334 and the end edge 324. The pin retainer 37 is mounted on the cover 33 for preventing the pin 34 from separating from the cover 33. Thus, the assembly process of the surface contact card holder 100 is finished.

Figure 5:
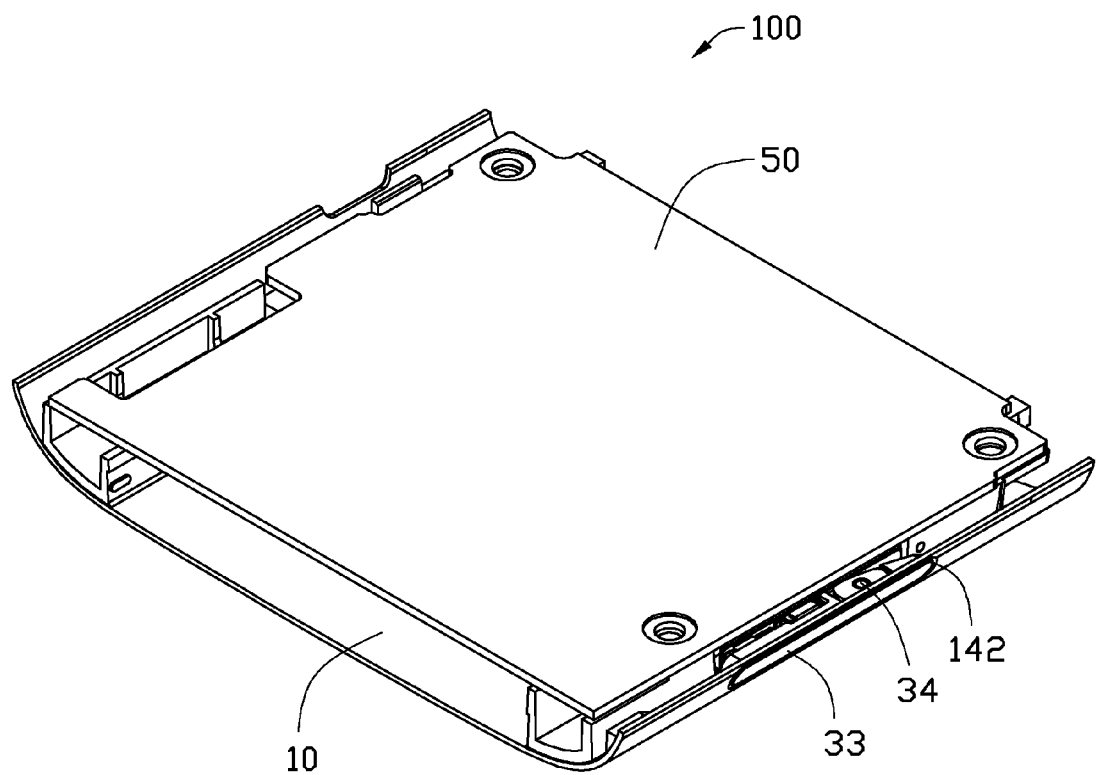
FIG. 5 is a schematic view of the surface contact card holder.

In use, referring to FIGS. 4 and 5, the surface contact card 40 is taken here as an exemplary application for the purposes of describing details of the surface contact holder 100. The surface contact card 40 is inserted into the receiving compartment 328 of the tray 32 to allow the surface contact card 40 to resist against the extending edge 3224 and the stopper edges 327. Then, the tray 20 with the surface contact card 40 is pushed to slide in the cavity 26 of the receiving frame 20 from the receiving hole 142 until the arcuate portions 3222 are latched in the grooves 182. At that time, the cover 33 covers the receiving hole 142. The surface contact card 40 is electronically connected to the connector 52, and one end of the surface contact card 40 abuts the sensor 54. The sensor 54 will transmit a signal of the tray 32 in position to the portable electronic device Thus, the surface contact card 40 is thereby held steadily in the housing.

To remove the surface contact card 40, referring to FIG. 4, the first end 334 is pressed toward the space 38 along an A arrow direction, the cover 33 is forced to pivot about the pin 34. The second end 336 overcomes the magnetic force of the magnet 35 to move out of the receiving hole 142. Then, the tray 32 is pulled to slide in the receiving frame 20 until the tray 32 is moved out of the receiving hole 142, and the surface contact card 40 is easily removed from the tray 32.

As described above, the exemplary embodiment provides a surface contact card holder for portable electronic devices, such as mobile phones. The surface contact card holder can be easily opened and is more user-friendly.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A surface contact card holder, comprising:
a housing including a receiving frame and defining a receiving hole;
a tray assembly comprising:
a tray being slidable and receivable in the receiving frame through the receiving hole, the tray configured for carrying a surface contact card therein;
a cover pivotally attached to the tray and covering the receiving hole, the cover including a first end and a second end, the cover defining a pin hole;
a pin formed on the tray and extending through the pin hole for pivotally connecting the cover to the tray; and
a pin retainer mounted on the cover configured to prevent the pin from separating from the cover,
wherein the first end of the cover is pressed to pivot the cover, the second end of the cover moves out of the receiving hole, the tray is slid out of the receiving frame to allow insertion and removal of the surface contact card from the housing.

2. The holder as claimed in claim 1, wherein the tray assembly includes a magnet mounted on the tray, the cover is made of metal, the magnet attracts the cover on the tray.

3. The holder as claimed in claim 1, wherein the tray includes an end edge, the end edge has a latching arm and a block, the latching arm defines a latching hole, the pin is formed on the block, the cover includes a protruding plate extending from the second end for engaging in the latching hole of the latching arm.

4. The holder as claimed in claim 3, wherein the tray further includes two opposite side edges, a rectangular plate portion and a plurality of stopper edges, the side edges, the end edge, the plate portion, and the stopper edges cooperatively define a receiving compartment to receive the surface contact card.

5. The holder as claimed in claim 4, wherein two opposite latching portion are formed on the housing, each latching portion defines a groove, the receiving frame includes two flanges, each flange defines an opening, each latching portion faces the opening for allowing the latching portions to be exposed from the opening, each side edge has an arcuate portion for being selectively received in the groove, and the arcuate portions position the tray in the receiving frame.

6. A portable electronic device comprising a holder for a surface contact card, the holder mounted on the portable electronic device and comprising:
a housing including a receiving frame and defining a receiving hole;
a tray assembly comprising:
a tray being slidable and receivable in the receiving frame through the receiving hole, the tray configured for carrying a surface contact card therein;
a cover pivotally attached to the tray and covering the receiving hole, the cover including a first end and a second end, the cover defining a pin hole;
a pin formed on the tray and extending through the pin hole for pivotally connecting the cover to the tray; and
a pin retainer mounted on the cover configured to prevent the pin from separating from the cover,
wherein the first end of the cover is pressed to rotate the cover, the second end of the cover moves out of the receiving hole, the tray is slid out of the receiving frame to allow insertion and removal of the surface contact card from the housing.

7. The portable electronic device as claimed in claim 6, wherein the tray assembly includes a magnet mounted on the tray, the cover is made of metal, the magnet attracts the cover on the tray.

8. The portable electronic device as claimed in claim 7, wherein the tray assembly includes a latching member for receiving the magnet, the latching member is mounted on the tray to position the magnet on the tray.

9. The portable electronic device as claimed in claim 6, wherein the tray includes an end edge, the end edge has a latching arm and a block, the latching arm defines a latching hole, the pin is formed on the block, the cover includes a protruding plate extending from the second end for engaging in the latching hole of the latching arm.

10. The portable electronic device as claimed in claim 9, wherein the tray further includes two opposite side edges, a rectangular plate portion and a plurality of stopper edges, the side edges, the end edge, the plate portion, and the stopper edges cooperatively define a receiving compartment to receive the surface contact card.

11. The portable electronic device as claimed in claim 9, wherein two opposite latching portion are formed on the housing, each latching portion defines a groove, the receiving frame includes two flanges, each flange defines an opening, each latching portion faces the opening for allowing the latching portions to be exposed from the opening, each side edge has an arcuate portion for being selectively received in the groove, and the arcuate portions position the tray in the receiving frame.

12. A surface contact card holder, comprising:
- a housing including a receiving frame and defining a receiving hole;
- a tray assembly comprising:
- a tray being slidable and receivable in the receiving frame through the receiving hole, the tray configured for carrying a surface contact card therein, the tray comprising an end edge, the end edge having a latching arm and a block, the latching arm defining a latching hole;
- a cover pivotally attached to the tray and covering the receiving hole, the cover defining a pin hole, and including a first end, a second end and a protruding plate that extends from the second end for engaging in the latching hole of the latching arm; and
- a pin formed on the block and extending through the pin hole for pivotally connecting the cover to the tray,
- wherein when the first end of the cover is pressed to pivot the cover, the second end of the cover moves out of the receiving hole, and the tray is configured to slide out of the receiving frame to allow insertion and removal of the surface contact card from the housing.

13. The holder as claimed in claim 12, wherein the tray further includes two opposite side edges, a rectangular plate portion and a plurality of stopper edges, the side edges, the end edge, the plate portion, and the stopper edges cooperatively define a receiving compartment to receive the surface contact card.

14. The holder as claimed in claim 13, wherein two opposite latching portion are formed on the housing, each latching portion defines a groove, the receiving frame includes two flanges, each flange defines an opening, each latching portion faces the opening for allowing the latching portions to be exposed from the opening, each side edge has an arcuate portion for being selectively received in the groove, and the arcuate portions position the tray in the receiving frame.

15. The holder as claimed in claim 12, wherein the tray assembly includes a magnet mounted on the tray, the cover is made of metal, the magnet attracts the cover on the tray.

16. The holder as claimed in claim 12, wherein the tray assembly further includes a pin retainer, the pin retainer is mounted on the cover to prevent the pin from separating from the cover.

* * * * *